(12) United States Patent
Lin et al.

(10) Patent No.: US 9,635,731 B2
(45) Date of Patent: Apr. 25, 2017

(54) BOOST APPARATUS WITH INTEGRATION OF OCP DETECTION AND OVP DETECTION

(71) Applicant: Beyond Innovation Technology Co., Ltd., Taipei (TW)

(72) Inventors: Chiu-Yuan Lin, Taipei (TW); Chien-Pang Hung, Taipei (TW); Chen-Lung Kao, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 0 days.

(21) Appl. No.: 15/080,588

(22) Filed: Mar. 25, 2016

(65) Prior Publication Data

US 2017/0034881 A1 Feb. 2, 2017

(30) Foreign Application Priority Data

Jul. 30, 2015 (TW) .............................. 104124811 A

(51) Int. Cl.
*H05B 33/08* (2006.01)
*H02H 9/00* (2006.01)

(52) U.S. Cl.
CPC .............. *H05B 33/089* (2013.01); *H02H 9/00* (2013.01); *H05B 33/0815* (2013.01)

(58) Field of Classification Search
CPC .. H05B 33/08; H05B 33/0818; H05B 33/0815; H05B 33/089; H05B 33/0851;
(Continued)

(56) References Cited

U.S. PATENT DOCUMENTS

| 6,229,293 B1 * | 5/2001 | Farrenkopf | H02M 3/156 323/222 |
| 6,768,655 B1 * | 7/2004 | Yang | H02M 1/4225 323/222 |

(Continued)

FOREIGN PATENT DOCUMENTS

| TW | 201308859 | 2/2013 |
| TW | 201421878 | 6/2014 |

(Continued)

OTHER PUBLICATIONS

"Office Action of Taiwan Counterpart Application", issued on Apr. 7, 2016, p. 1-p. 6, in which the listed references were cited.

*Primary Examiner* — Thai Pham
(74) *Attorney, Agent, or Firm* — Jianq Chyun IP Office

(57) ABSTRACT

A boost apparatus including a boost power conversion circuit and a control chip is provided. The boost power conversion circuit is configured to receive a DC input voltage and provide a DC output voltage to a light-emitting-diode (LED) load in response to a pulse-width-modulation (PWM) signal. The control chip has a first complex function pin, and is configured to: generate the PWM signal to control the operation of the boost power conversion circuit; perform an OCP detection on the boost power conversion circuit through the first complex function pin when the PWM signal is enabled to determine whether to activate an OCP mechanism; and perform an OVP detection on the boost power conversion circuit through the first complex function pin when the PWM signal is disabled to determine whether to activate an OVP mechanism.

10 Claims, 3 Drawing Sheets

(58) Field of Classification Search
CPC .... H05B 33/0887; H02H 3/00; H02H 7/1213;
H02H 3/202; H02H 9/00; H02M 1/32;
H02M 3/156; H02M 3/158
USPC .... 315/119, 122, 123, 185 R, 186, 291, 307, 315/308, 312
See application file for complete search history.

(56) References Cited

U.S. PATENT DOCUMENTS

| | | | | |
|---|---|---|---|---|
| 8,912,781 | B2* | 12/2014 | Singh | H02M 3/156 |
| | | | | 323/285 |
| 2006/0261752 | A1 | 11/2006 | Lee | |
| 2008/0043404 | A1* | 2/2008 | Frankel | H01R 31/065 |
| | | | | 361/600 |
| 2010/0110593 | A1* | 5/2010 | Kim | H02M 1/32 |
| | | | | 361/18 |

FOREIGN PATENT DOCUMENTS

| | | |
|---|---|---|
| TW | 201422053 | 6/2014 |
| TW | 201507332 | 2/2015 |

* cited by examiner

BOOST APPARATUS WITH INTEGRATION OF OCP DETECTION AND OVP DETECTION

CROSS-REFERENCE TO RELATED APPLICATION

This application claims the priority benefit of Taiwan application serial no. 104124811, filed on Jul. 30, 2015. The entirety of the above-mentioned patent application is hereby incorporated by reference herein and made a part of this specification.

BACKGROUND OF THE INVENTION

Field of the Invention

The invention relates to a power conversion and supply technique, and more particularly, to a boost apparatus with integration of OCP detection and OVP detection.

Description of Related Art

The current pulse-width modulation (PWM-based) boost apparatus can be configured to provide a DC output voltage to a load, and the control chip therein generally has two independent detection pins to respectively and independently detect whether over-current phenomenon and over-voltage phenomenon occur to the boost apparatus, so as to determine whether to activate the corresponding over-current protection mechanism and over-voltage protection mechanism. Under such conditions, if additional circuit functions are to be provided to the boost apparatus, then the quantity of pins of the control chip needs to be correspondingly increased, and therefore the chip (IC) cost is increased.

SUMMARY OF THE INVENTION

Accordingly, the invention provides a boost apparatus with integration of OCP detection and OVP detection to effectively solve the issue mentioned in the prior art.

Other objects and advantages of the invention can be further understood via the technical features disclosed in the invention.

Therefore, an exemplary embodiment of the invention provides a boost apparatus suitable for providing a DC output voltage to a light-emitting diode (LED) load, including: a boost power conversion circuit and a control chip. In particular, the boost power conversion circuit is configured to receive a DC input voltage and provide the DC output voltage to the LED load in response to a pulse-width-modulation (PWM) signal. The control chip is coupled to the boost power conversion circuit, and has a first complex function pin. The control chip is configured to: generate the PWM signal to control the operation of the boost power conversion circuit; perform an OCP detection on the boost power conversion circuit through the first complex function pin when the PWM signal is enabled to determine whether to activate an OCP mechanism; and perform an OVP detection on the boost power conversion circuit through the first complex function pin when the PWM signal is disabled to determine whether to activate an OVP mechanism.

In an exemplary embodiment of the invention, the first complex function pin may be an OCP/OVP pin, and the boost power conversion circuit may include: an inductor, a first diode, a first capacitor, an N-type power switch, and a first resistor. In particular, the first end of the inductor is configured to receive the DC input voltage. The anode of the first diode is coupled to the second end of the inductor and the OCP/OVP pin, and the cathode of the first diode is coupled to the anode of the LED load and configured to generate the DC output voltage. The first end of the first capacitor is coupled to the cathode of the first diode, and the second end of the first capacitor is coupled to a ground potential. The drain of the N-type power switch is coupled to the anode of the first diode, the gate of the N-type power switch is configured to receive the PWM signal, and the source of the N-type power switch is coupled to the OCP/OVP pin. The first end of the first resistor is coupled to the source of the N-type power switch, and the second end of the first resistor is coupled to the ground potential.

In an exemplary embodiment of the invention, when the PWM signal is enabled, the control chip can detect the cross voltage of the first resistor through the OCP/OVP pin, and perform the OCP detection on the boost power conversion circuit in response to the cross voltage of the first resistor to determine whether to activate the OCP mechanism. Under such conditions, every time the cross voltage of the first resistor is greater than a built-in OCP reference voltage of the control chip, the control chip activates the OCP mechanism to gradually reduce the duty cycle of the PWM signal until the duty cycle of the PWM signal is reduced to a minimum duty cycle or the cross voltage of the first resistor is less than the OCP reference voltage.

In an exemplary embodiment of the invention, when the PWM signal is disabled, the control chip can detect the anode voltage of the first diode through the OCP/OVP pin, and perform the OVP detection on the boost power conversion circuit in response to the anode voltage of the first diode to determine whether to activate the OVP mechanism. Under such conditions, every time the anode voltage of the first diode is greater than a built-in OVP reference voltage of the control chip, the control chip activates the OVP mechanism to adjust the next duty cycle of the PWM signal to a minimum duty cycle until the anode voltage of the first diode is less than the OVP reference voltage.

In an exemplary embodiment of the invention, the control chip may have an INN pin, and the boost apparatus may further include: a feedback voltage coupled between the cathode of the LED load and the INN pin and configured to provide a feedback voltage relating to the LED load to the control chip. Under such conditions, the control chip may further adjust the PWM signal in response to the feedback voltage to control the boost power conversion circuit to stably provide the DC output voltage.

In an exemplary embodiment of the invention, the control chip may further have a second complex function pin, and the second complex function pin may be a CMP/EA pin, and the boost apparatus may further include: a resistor-capacitor network and an enable/dimming circuit. In particular, the resistor-capacitor network is coupled to the CMP/EA pin and configured to compensate a compensation voltage on the CMP/EA pin to stabilize the PWM signal outputted by the control chip so as to stabilize the DC output voltage provided by the boost power conversion circuit. The enable/dimming circuit is coupled to the CMP/EA pin and configured to allow the control chip to have a chip enable function and a dimming function. Under such conditions, when the control chip does not receive the feedback voltage from the feedback circuit, the compensation voltage gradually climbs to a preset maximum voltage level from a normal operation level. When the compensation voltage is kept at the preset maximum voltage level for a preset time, the control chip enters a shutdown status.

Based on the above, in the exemplary embodiments of the invention, since the OCP detection and the OVP detection of the boost apparatus are performed/executed when the PWM signal is respectively enabled and disabled, the control chip can achieve OCP and OVP of the boost apparatus through the same OCP/OVP pin. Through the integration of the OCP detection and the OVP detection, the quantity of pins of the control chip can be reduced to lower chip cost and to solve the issues mentioned in the prior art.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
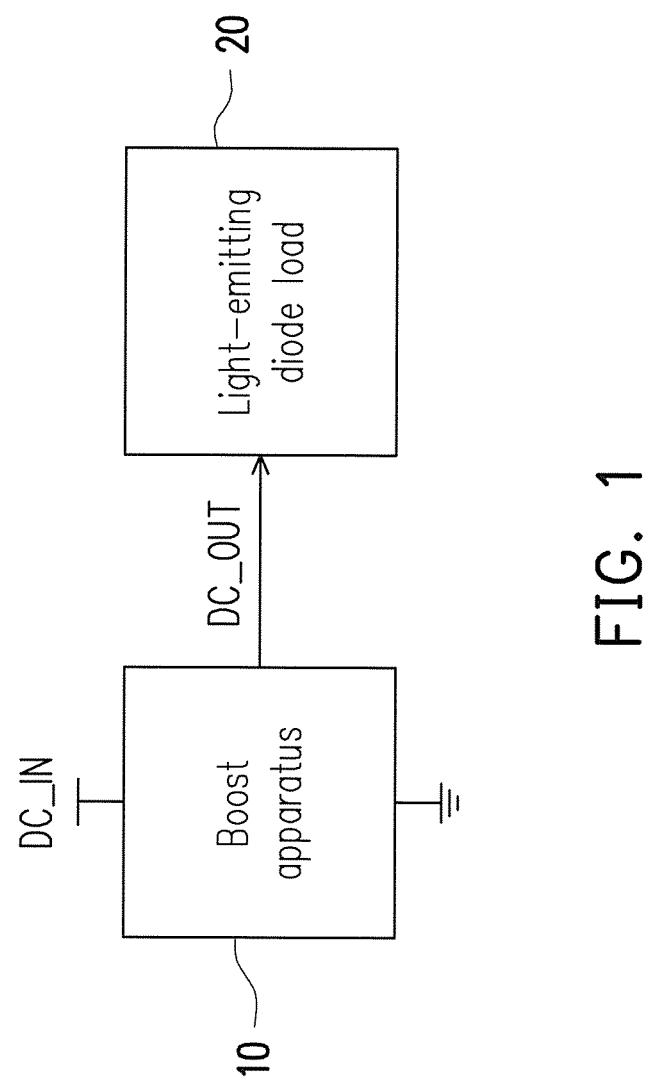
FIG. 1 shows a system block diagram of a boost apparatus 10 of an exemplary embodiment of the invention.

Descriptions of the invention are given with reference to the exemplary embodiments illustrated with accompanied drawings. In addition, whenever possible, elements/components having the same reference numerals represent the same or similar parts in the figures and the embodiments.

Figure 2:
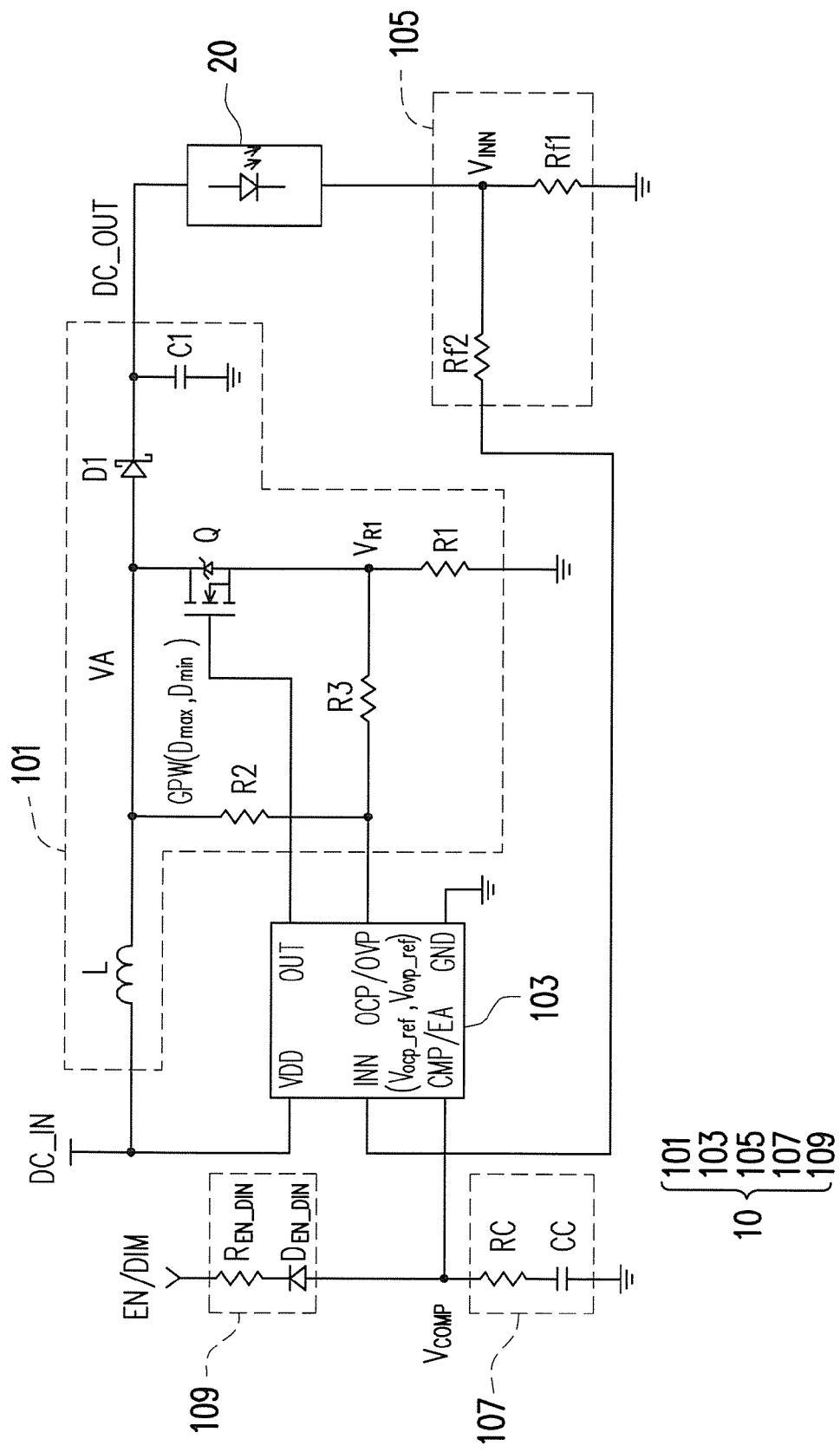
FIG. 2 shows an implementation schematic of the boost apparatus 10 of FIG. 1.

FIG. 1 shows a system block diagram of a boost apparatus 10 of an exemplary embodiment of the invention, and FIG. 2 shows an implementation schematic of the boost apparatus 10 of FIG. 1. Referring to both FIG. 1 and FIG. 2, the boost apparatus 10 is suitable for providing a DC output voltage DC_OUT to any type of load, such as: a light-emitting diode (LED) load 20, but is not limited thereto. The boost apparatus 10 may include: a boost power conversion circuit 101, a control chip 103, a feedback circuit 105, a resistor-capacitor (RC) network 107, and an enable/dimming circuit 109.

In the present exemplary embodiment, the boost power conversion circuit 101 can be configured to receive a DC input voltage DC_IN and provide the DC output voltage DC_OUT to the LED load 20 in response to a pulse-width-modulation (PWM) signal GPW from the control chip 105. For instance, the boost power conversion circuit 101 may include: an inductor L, a diode D1 (such as a Schottky diode, but not limited thereto), a capacitor C1, an N-type power switch Q, and resistors R1 to R3. In particular, the N-type power switch Q can be implemented by an N-type power MOSFET, but is not limited thereto.

The first end of the inductor L is configured to receive (or be coupled to) the DC input voltage DC_IN. The anode of the diode D1 is coupled to the second end of the inductor L and can be coupled to an OCP/OVP pin (i.e., first complex function pin) of the control chip 103 through the resistor R2, and the cathode of the diode D1 is coupled to the anode of the LED load 20 and configured to generate the DC output voltage DC_OUT. The first end of the capacitor C1 is coupled to the cathode of the diode D1, and the second end of the capacitor C1 is coupled to the ground potential (0 V). The drain of the N-type power switch Q is coupled to the anode of the diode D1, the gate of the N-type power switch Q is configured to receive the PWM signal GPW outputted by the OUT pin of the control chip 103, and the source of the N-type power switch Q can be coupled to the OCP/OVP pin of the control chip 103 through the resistor R3. The first end of the resistor R1 is coupled to the source of the N-type power switch Q, and the second end of the resistor R1 is coupled to the ground potential.

Moreover, the feedback circuit 105 is coupled between the cathode of the LED load 20 and an INN pin of the control chip 103 to provide a feedback voltage $V_{INN}$ relating to the LED load 20 to the control chip 103. Under such conditions, the control chip 103 can further adjust the PWM signal GPW (such as adjusting the duty cycle of the PWM signal GPW) in response to the feedback voltage $V_{INN}$ provided by the feedback circuit 105 to control the boost power conversion circuit 101 to stably provide the DC output voltage DC_OUT to the LED load 20. In the present exemplary embodiment, the feedback circuit 105 can be formed by two feedback resistors (Rf1 and Rf2), but is not limited thereto. In particular, the first end of the feedback resistor Rf1 is coupled to the cathode of the LED load 20, and the second end of the feedback resistor Rf1 is coupled to the ground potential. Moreover, the first end of the feedback resistor Rf2 is also coupled to the cathode of the LED load 20, and the second end of the feedback resistor Rf2 is coupled to the INN pin of the control chip 103.

Moreover, the RC network 107 is coupled to a CMP/EA pin (i.e., second complex function pin) of the control chip 103 and configured to compensate a compensation voltage $V_{COMP}$ on the CMP/EA pin of the control chip 103 to stabilize the PWM signal GPW outputted by the control chip 103, so as to stabilize the DC output voltage DC_OUT provided by the boost power conversion circuit 101. In the present exemplary embodiment, the RC network 107 can also be formed by a compensation resistor RC and a compensation capacitor CC connected in series, but is not limited thereto.

Moreover, in addition to having the above OCP/OVP pin (i.e., first complex function pin), OUT pin, INN pin, and CMP/EA pin (i.e., second complex function pin), the control chip 103 can also have a VDD pin and a GND pin. Of course, based on actual design/application requirements, other functional pins can be added to the control chip 103, or existing functional pins of the control chip 103 can be removed. Basically, to allow the control chip 103 to operate normally, the VDD pin receives the DC input voltage DC_IN needed for an operation, and the GND pin is coupled to the ground potential. As a result, the control chip 103 can perform conversion (such as boosting/bucking) on the DC input voltage DC_IN to obtain the operating voltage needed for the internal circuits (not shown) thereof.

In the present exemplary embodiment, the control chip 103 is coupled to the boost power conversion circuit 101 and is configured to: 1) generate the PWM signal GPW to control the operation of the boost power conversion circuit 101; 2) perform an OCP detection on the boost power conversion circuit 101 through the OCP/OVP pin when the PWM signal GPW is enabled to determine whether to activate an OCP mechanism; and 3) perform an OVP detection on the boost power conversion circuit 101 through the OCP/OVP pin when the PWM signal GPW is disabled to determine whether to activate an OVP mechanism.

More specifically, when the PWM signal GPW is enabled, the control chip 103 detects a cross voltage $V_{R1}$ of the first resistor R1 through the OCP/OVP pin and performs the OCP detection on the boost power conversion circuit 101 in response to the cross voltage $V_{R1}$ of the first resistor R1 to determine whether to activate the OCP mechanism. Under such conditions, every time the cross voltage $V_{R1}$ of the first resistor R1 is greater than (or reaches) a built-in OCP reference voltage Vocp_ref of the control chip 103, the control chip 103 activates the OCP mechanism to gradually reduce the duty cycle of the PWM signal GPW until the duty cycle of the PWM signal GPW is reduced to the minimum duty cycle (Dmin) or the cross voltage $V_{R1}$ of the first resistor R1 is less than the OCP reference voltage Vocp_ref (i.e., over-current phenomenon no longer exists).

For instance, in the case that the previous duty cycle of the PWM signal GPW is 75% (condition 1), once the cross voltage $V_{R1}$ of the first resistor R1 is greater than the built-in OCP reference voltage Vocp_ref of the control chip 103 under condition 1 (75%), the control chip 103 activates the OCP mechanism to reduce the current duty cycle of the PWM signal GPW (such as reducing to 60%, but not limited thereto) (condition 2). Once the cross voltage $V_{R1}$ of the first resistor R1 is also greater than the built-in OCP reference voltage Vocp_ref of the control chip 103 under condition 2 (60%) (i.e., persisting over-current phenomenon), the control chip 103 continues to activate the OCP mechanism to reduce the next duty cycle of the PWM signal GPW (such as reducing to 50%, but not limited thereto), and so on, until the duty cycle of the PWM signal GPW is reduced to the minimum duty cycle (Dmin); on the other hand, once the cross voltage $V_{R1}$ of the first resistor R1 becomes less than the built-in OCP reference voltage Vocp_ref under condition 2 (60%), the control chip 103 deactivates the OCP mechanism (i.e., over-current phenomenon no longer exists).

Moreover, when the PWM signal GPW is disabled, the control chip 103 detects the anode voltage VA of the diode D1 through the OCP/OVP pin and performs the OVP detection on the boost power conversion circuit 101 in response to the anode voltage VA of the diode D1 to determine whether to activate the OVP mechanism Under such conditions, every time the anode voltage VA of the diode D1 is greater than (or reaches) a built-in OVP reference voltage Vovp_ref of the control chip 103, the control chip 103 activates the OVP mechanism to adjust the next duty cycle of the PWM signal GPW to the minimum duty cycle (Dmin) until the anode voltage VA of the diode D1 is less than the OVP reference voltage Vovp_ref (i.e., overvoltage phenomenon no longer exists).

Figure 3:
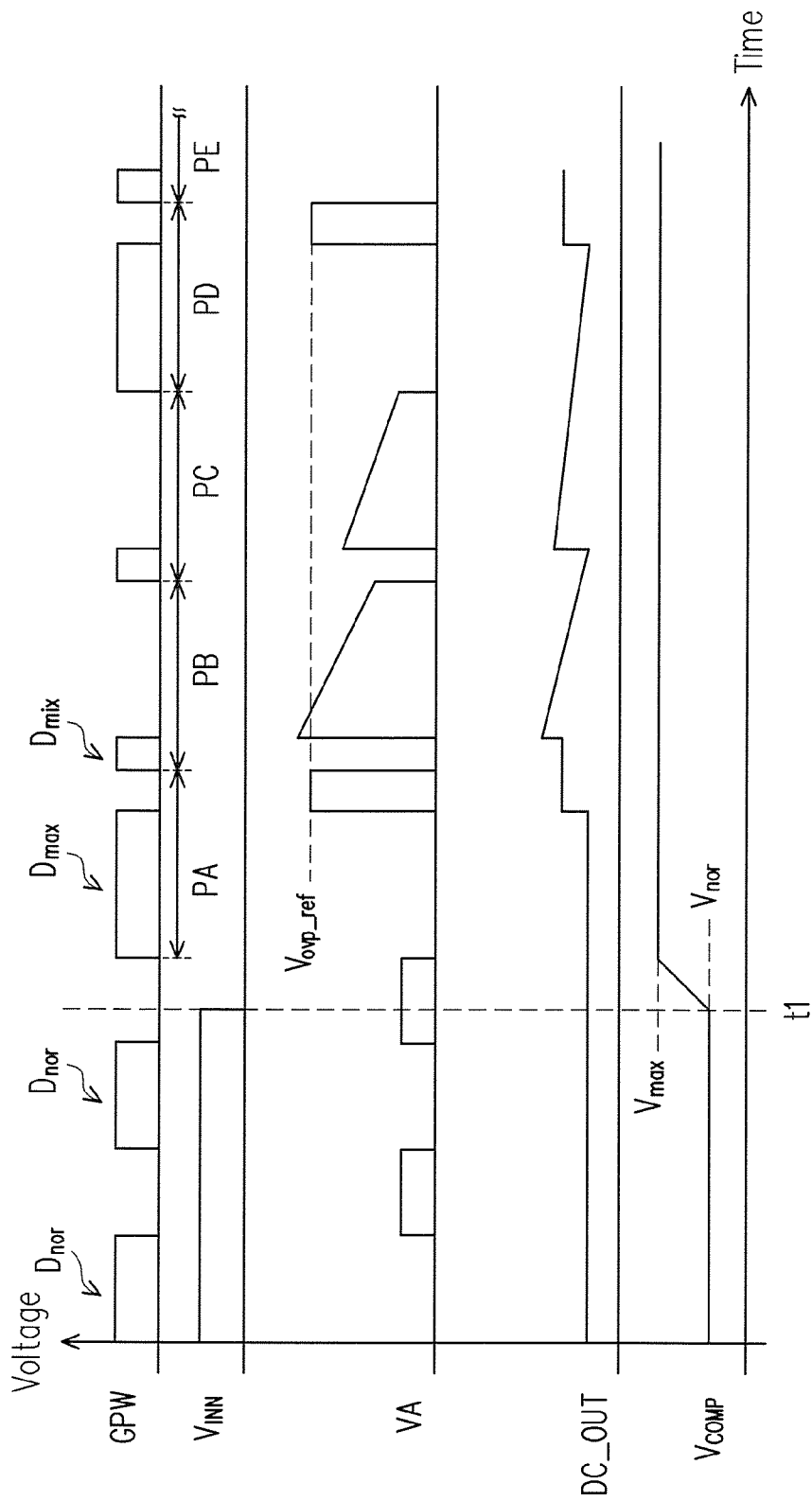
FIG. 3 shows a portion of the operation waveform of the boost apparatus 10 of FIG. 2.

For instance, FIG. 3 shows a portion of the operation waveform of the boost apparatus 10 of FIG. 2. Referring to both FIG. 2 and FIG. 3, in the case that the boost apparatus 10 is in a normal operation status before a time t1, under such a condition, the control chip 103 outputs the PWM signal GPW having a duty cycle Dnor in response to the feedback voltage $V_{INN}$ returned/provided by the feedback circuit 105 to control the boost power conversion circuit 101 to stably provide the DC output voltage DC_OUT to the LED load 20. Moreover, when the boost apparatus 10 is in the normal operation status, since over-current phenomenon ($V_{R1}$<Vocp_ref) and over-voltage phenomenon (VA<Vovp_ref) do not occur, the control chip 103 does not activate the corresponding OCP mechanism and OVP mechanism, and the compensation voltage $V_{COMP}$ on the CMP/EA pin of the control chip 103 is in a normal operation level Vnor.

Moreover, in the case that the LED load 20 malfunctions at the time t1 (such as an open circuit), under such a condition, since the feedback circuit 105 cannot feedback/provide the feedback voltage $V_{INN}$ (0 V) to the control chip 103, the control chip 103 outputs the PWM signal GPW having the maximum duty cycle (Dmax) in a cycle (or period) PA to control the boost power conversion circuit 101. In the cycle PA, when the PWM signal GPW having the maximum duty cycle (Dmax) is disabled, since the anode voltage VA of the diode D1 reaches the OVP reference voltage Vovp_ref, the control chip 103 activates the OVP mechanism to adjust the duty cycle of the PWM signal GPW in a cycle PB to the minimum duty cycle (Dmin). Similarly, in the cycle PB, when the PWM signal GPW having the minimum duty cycle (Dmin) is disabled, since the anode voltage VA of the diode D1 still reaches the OVP reference voltage Vovp_ref, the control chip 103 also activates the OVP mechanism to keep the duty cycle of the PWM signal GPW in a cycle PC at the minimum duty cycle (Dmin).

On the contrary, in the cycle PC, when the PWM signal GPW having the minimum duty cycle (Dmin) is disabled, since the anode voltage VA of the diode D1 is less than the OVP reference voltage Vovp_ref, the control chip 103 deactivates the OVP mechanism. However, since feedback/supply of the feedback voltage $V_{INN}$ (0 V) still does not occur, the control chip 103 still outputs the PWM signal GPW having the maximum duty cycle (Dmax) in a cycle PD to control the boost power conversion circuit 101. However, in the cycle PD, when the PWM signal GPW having the maximum duty cycle (Dmax) is disabled, since the anode voltage VA of the diode D1 reaches the OVP reference voltage Vovp_ref again, the control chip 103 activates the OVP mechanism again to adjust the duty cycle of the PWM signal GPW in a cycle PE to the minimum duty cycle (Dmin). Based on the above exemplified content in which the OVP mechanism activated (deactivated) by the control chip 103 in the cycles PA to PE, the operation method of the control chip 103 after the cycle PE can be extrapolated, and is not repeated herein.

However, the operation (such as intermittent/continuous activation of the OVP mechanism) of the control chip 103 when the LED load 20 is malfunctioned (open circuit) also generates unnecessary power loss. Therefore, in the present exemplary embodiment, the control chip 103 can further decide whether to enter a shutdown status by detecting changes of the compensation voltage $V_{COMP}$ on the CMP/EA pin. More specifically, when the control chip 103 does not receive the feedback voltage $V_{INN}$ from the feedback circuit 105, the compensation voltage $V_{COMP}$ gradually climbs to a preset maximum voltage level Vmax from the normal operation level Vnor. When the compensation voltage Vmax is kept at the preset maximum voltage level Vmax for a preset time (such as: 156 ms, but not limited thereto), the control chip 103 enters the shutdown status to avoid the generation of unnecessary power loss.

Moreover, the enable/dimming circuit 109 is coupled to the CMP/EA pin of the control chip 103 and configured to allow the control chip 103 to have a chip enable function and a dimming function. More specifically, the enable/dimming circuit 109 can also be formed by a resistor $R_{EN\_DIM}$ and a diode $D_{EN\_DIM}$ connected in series, but is not limited thereto. In the present exemplary embodiment, the enable/dimming circuit 109 can activate the control chip 103 in response to the input of an enable signal EN (as a result, the control chip 103 can have the chip enable function); moreover, the enable/dimming circuit 109 can make the control chip 103 perform a dimming operation on the LED load 20 in response to the input of a dimming signal DIM (for instance, the control chip 103 can output the PWM signal GPW only when the inputted dimming signal DIM is enabled; on the other hand, when the inputted dimming signal DIM is disabled, the control chip 103 stops outputting the PWM signal GPW. In this way, the control chip 103 can have dimming function).

Based on the above, in the exemplary embodiments of the invention, since the OCP detection and the OVP detection of the boost apparatus 10 are performed/executed when the PWM signal GPW is respectively enabled and disabled, the control chip 103 can achieve OCP and OVP of the boost apparatus 10 through the same OCP/OVP pin. Through the integration of the OCP detection and the OVP detection, the quantity of pins of the control chip 103 can be reduced to lower chip cost and to solve the issues mentioned in the prior art.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A boost apparatus suitable for providing a direct current (DC) output voltage to a light-emitting diode (LED) load, the boost apparatus comprising:
    a boost power conversion circuit configured to receive a DC input voltage and provide the DC output voltage to the LED load in response to a pulse-width-modulation (PWM) signal; and
    a control chip coupled to the boost power conversion circuit and having a first complex function pin, wherein the control chip is configured to:
        generate the PWM signal to control an operation of the boost power conversion circuit;
        perform an over-current protection (OCP) detection on the boost power conversion circuit through the first complex function pin when the PWM signal is enabled to determine whether to activate an OCP mechanism; and
        perform an over-voltage protection (OVP) detection on the boost power conversion circuit through the first complex function pin when the PWM signal is disabled to determine whether to activate an OVP mechanism.

2. The boost apparatus of claim 1, wherein the first complex function pin is an OCP/OVP pin, and the boost power conversion circuit comprises:
    an inductor, wherein a first end thereof is configured to receive the DC input voltage;
    a first diode, wherein an anode thereof is coupled to a second end of the inductor and the OCP/OVP pin, and a cathode thereof is coupled to an anode of the LED load and configured to generate the DC output voltage;
    a first capacitor, wherein a first end thereof is coupled to the cathode of the first diode, and a second end thereof is coupled to a ground potential;
    an N-type power switch, wherein a drain thereof is coupled to the anode of the first diode, a gate thereof is configured to receive the PWM signal, and a source thereof is coupled to the OCP/OVP pin; and
    a first resistor, wherein a first end thereof is coupled to the source of the N-type power switch, and a second end thereof is coupled to the ground potential.

3. The boost apparatus of claim 2, wherein the boost power conversion circuit further comprises:
    a second resistor, wherein a first end thereof is coupled to the second end of the inductor and the anode of the first diode, and a second end thereof is coupled to the OCP/OVP pin; and
    a third resistor, wherein a first end thereof is coupled to the source of the N-type power switch and the first end of the first resistor, and a second end thereof is coupled to the OCP/OVP pin.

4. The boost apparatus of claim 2, wherein the first diode is a Schottky diode.

5. The boost apparatus of claim 2, wherein:
    when the PWM signal is enabled, the control chip detects a cross voltage of the first resistor through the OCP/OVP pin and performs the OCP detection on the boost power conversion circuit in response to the cross voltage of the first resistor to determine whether to activate the OCP mechanism; and
    every time the cross voltage of the first resistor is greater than a built-in OCP reference voltage of the control chip, the control chip activates the OCP mechanism to gradually reduce a duty cycle of the PWM signal until the duty cycle of the PWM signal is reduced to a minimum duty cycle or the cross voltage of the first resistor is less than the OCP reference voltage.

6. The boost apparatus of claim 2, wherein:
    when the PWM signal is disabled, the control chip detects an anode voltage of the first diode through the OCP/OVP pin and performs the OVP detection on the boost power conversion circuit in response to the anode voltage of the first diode to determine whether to activate the OVP mechanism; and
    every time the anode voltage of the first diode is greater than a built-in OVP reference voltage of the control chip, the control chip activates the OVP mechanism to adjust a next duty cycle of the PWM signal to a minimum duty cycle until the anode voltage of the first diode is less than the OVP reference voltage.

7. The boost apparatus of claim 2, wherein the control chip further has an INN pin, and the boost apparatus further comprises:
    a feedback circuit coupled between a cathode of the LED load and the INN pin and configured to provide a feedback voltage relating to the LED load to the control chip,
    wherein the control chip further adjusts the PWM signal in response to the feedback voltage to control the boost power conversion circuit to stably provide the DC output voltage.

8. The boost apparatus of claim 7, wherein the feedback circuit comprises:
    a first feedback resistor, wherein a first end thereof is coupled to the cathode of the LED load, and a second end thereof is coupled to the ground potential; and
    a second feedback resistor, wherein a first end thereof is coupled to the cathode of the LED load, and a second end thereof is coupled to the INN pin.

9. The boost apparatus of claim 7, wherein the control chip further has a second complex function pin, the second complex function pin is a CMP/EA pin, and the boost apparatus further comprises:
    a resistor-capacitor network coupled to the CMP/EA pin and configured to compensate a compensation voltage on the CMP/EA pin to stabilize the PWM signal so as to stabilize the DC output voltage provided by the boost power conversion circuit; and
    an enable/dimming circuit coupled to the CMP/EA pin and configured to allow the control chip to have a chip enable function and a dimming function,
    wherein when the control chip does not receive the feedback voltage from the feedback circuit, the compensation voltage gradually climbs to a preset maximum voltage level from a normal operation level,
wherein when the compensation voltage is kept at the preset maximum voltage level for a preset time, the control chip enters a shutdown status.

10. The boost apparatus of claim 2, wherein the control chip further has: an OUT pin coupled to the gate of the N-type power switch to output the PWM signal; a VDD pin configured to receive the DC input voltage needed for an operation; and a GND pin coupled to the ground potential.

* * * * *